US010001997B2

(12) United States Patent
Khot et al.

(10) Patent No.: US 10,001,997 B2
(45) Date of Patent: *Jun. 19, 2018

(54) PRIORITIZING INSTRUCTIONS BASED ON TYPE

(71) Applicant: Imagination Technologies Limited, Kings Langley (GB)

(72) Inventors: Anand Khot, Watford (GB); Hugh Jackson, Sydney (AU)

(73) Assignee: MIPS Tech, LLC, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/387,394

(22) Filed: Dec. 21, 2016

(65) Prior Publication Data

US 2017/0102949 A1    Apr. 13, 2017

Related U.S. Application Data

(63) Continuation of application No. 14/340,932, filed on Jul. 25, 2014, now Pat. No. 9,558,001.

(30) Foreign Application Priority Data

Jul. 31, 2013 (GB) .................................. 1313674.2

(51) Int. Cl.
*G06F 9/38* (2018.01)
*G06F 9/32* (2018.01)
*G06F 9/30* (2018.01)

(52) U.S. Cl.
CPC ............ *G06F 9/384* (2013.01); *G06F 9/3016* (2013.01); *G06F 9/32* (2013.01); *G06F 9/3855* (2013.01)

(58) Field of Classification Search
None
See application file for complete search history.

(56) References Cited

U.S. PATENT DOCUMENTS

| 5,644,742 | A | 7/1997 | Shen et al. |
| 6,105,128 | A | 8/2000 | Hathaway et al. |
| 7,107,433 | B1 | 9/2006 | Nguyen |
| 2002/0040421 | A1* | 4/2002 | Muta ....................... G06F 9/383 711/125 |
| 2003/0163671 | A1 | 8/2003 | Gschwind et al. |
| 2004/0088523 | A1 | 5/2004 | Kessler et al. |
| 2004/0181651 | A1 | 9/2004 | Sugumar et al. |
| 2006/0069872 | A1 | 3/2006 | Bouchard |
| 2006/0200648 | A1 | 9/2006 | Falkenberg |

(Continued)

*Primary Examiner* — Eric Coleman
(74) *Attorney, Agent, or Firm* — Vorys, Sater, Seymour and Pease LLP; Vincent M DeLuca

(57) ABSTRACT

Methods and reservation stations for selecting instructions to issue to a functional unit of an out-of-order processor. The method includes classifying each instruction into one of a number of categories based on the type of instruction. Once classified an instruction is stored in an instruction queue corresponding to the category in which it was classified. Instructions are then selected from one or more of the instruction queues to issue to the functional unit based on a relative priority of the plurality of types of instructions. This allows certain types of instructions (e.g. control transfer instructions, flag setting instructions and/or address generation instructions) to be prioritized over other types of instructions even if they are younger.

20 Claims, 7 Drawing Sheets

(56) References Cited

U.S. PATENT DOCUMENTS

| | | |
|---|---|---|
| 2011/0271057 A1 | 11/2011 | Karlsson |
| 2012/0221835 A1 | 8/2012 | Tran |
| 2012/0260075 A1* | 10/2012 | Henry ................ G06F 9/30174 |
| | | 712/225 |
| 2013/0046956 A1 | 2/2013 | Tran et al. |
| 2013/0262725 A1 | 10/2013 | Ito et al. |
| 2013/0339679 A1 | 12/2013 | Iyer |

* cited by examiner

| Instruction | Ready | Issued |
|---|---|---|
| Instruction 15 | 0 | 0 |
| Instruction 14 | 0 | 0 |
| Instruction 13 | 0 | 0 |
| Instruction 12 | 0 | 0 |
| Instruction 11 | 0 | 0 |
| Instruction 10 | 1 | 0 |
| Instruction 9 | 1 | 0 |
| Instruction 8 | 1 | 0 |
| Instruction 7 | 1 | 0 |
| Instruction 6 | 1 | 0 |
| Instruction 5 | 1 | 0 |
| Instruction 4 | 1 | 1 |
| Instruction 3 | 1 | 0 |
| Instruction 2 | 0 | 0 |
| Instruction 1 | 1 | 1 |
| Instruction 0 | 1 | 1 |

FIG. 3

PRIORITIZING INSTRUCTIONS BASED ON TYPE

BACKGROUND

Superscalar processors are designed to issue more than one instruction per clock cycle. Generally these processors comprise one or more reservation stations that receive and store instructions until they are ready to be issued to the out-of-order pipelines for execution. An instruction is said to be ready for issue when all of its input operands are available.

Each clock cycle the reservation station selects a number of ready instructions (e.g. one per out-of-order pipeline) and issues them to the out-of-order pipelines for execution. However, in any given clock cycle there can be a number of instructions that are ready for issue. Accordingly, there must be some mechanism for selecting ready instructions to issue to the out-of-order pipelines.

Typically the highest priority is given to the oldest ready instructions and the lowest priority is given to the youngest ready instructions. Issuing the oldest instructions as soon as possible ensures that the re-order buffer does not fill up and stall the dispatching of instructions. However, this policy alone does not ensure optimum processor performance.

The embodiments described below are not limited to implementations which solve any or all of the disadvantages of known processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and reservation stations for selecting instructions to issue to a functional unit of an out-of-order processor. The method includes classifying each instruction into one of a number of categories based on the type of instruction. Once classified an instruction is stored in an instruction queue corresponding to the category in which it was classified. Instructions are then selected from one or more of the instruction queues to issue to the functional unit based on a relative priority of the types of instructions. This allows certain types of instructions (e.g. control transfer instructions, flag setting instructions and/or address generation instructions) to be prioritized over other types of instructions even if they are younger.

A first aspect provides a method of selecting instructions to issue to a functional unit in an out-of-order processor, the method comprising: receiving a plurality of instructions at a reservation station, each instruction being one of a plurality of types of instructions and being classified into one of a plurality of categories based on the type of instruction; storing, at the reservation station, each instruction in one of a plurality of instruction queues, each instruction queue being associated with one of the plurality of categories; and selecting, at the reservation station, instructions from one or more of the instruction queues to issue to the functional unit based on a relative priority of the plurality of types of instructions.

A second aspect provides a reservation station to select instructions to issue to a functional unit in an out-of-order processor, the reservation station comprising: an instruction classifier configured to receive a plurality of instructions, each instruction being one of a plurality of instruction types and being classified (or configured to classify) into one of a plurality of categories based on the type of instruction; a plurality of instruction queues in communication with the instruction classifier, each instruction queue configured to receive instructions from the instruction classifier that have been classified into a particular category and store the received instructions; and an instruction scheduler in communication with each of the plurality of instruction queues, the instruction scheduler configured to select instructions from one or more of the instruction queues to issue to the functional unit based on a relative priority of the plurality of types of instructions.

A third aspect provides a processor comprising the reservation station described herein.

Further aspects provide a single-threaded out-of-order processor as substantially described with reference to FIG. 1, a reservation station as substantially described with reference to FIG. 2, a method of selecting instructions to issue to a functional unit as substantially described with reference to FIG. 4 and a multi-threaded out-of-order processor as substantially described with reference to FIG. 5.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 3 is a schematic diagram of an example instruction queue of FIG. 2;

Figure 1:
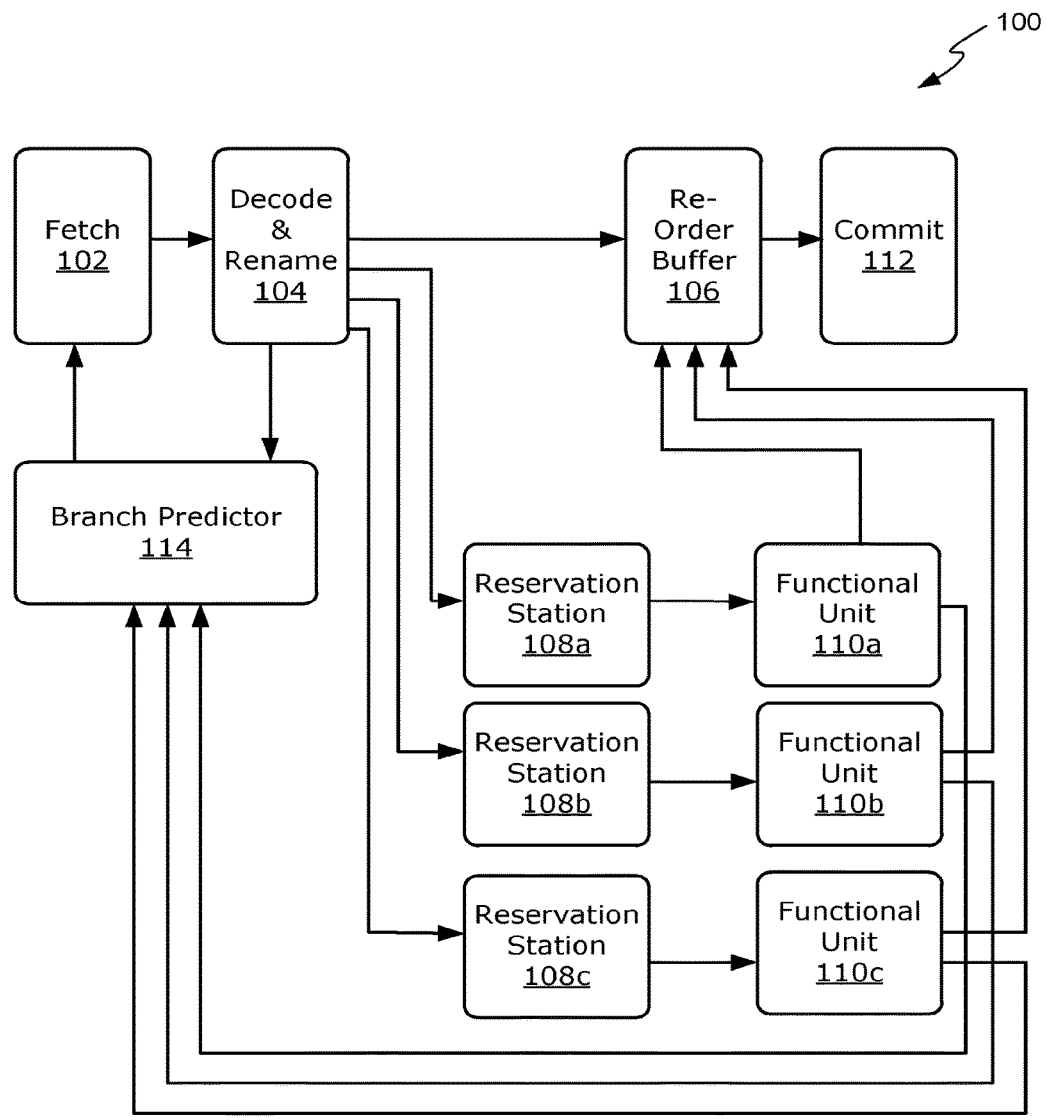
FIG. 1 is a schematic diagram of an example single-threaded out-of-order processor.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

It has been identified that executing certain types of instructions (e.g. control transfer instructions, flag setting instructions and address generation instructions) as soon as possible, even if they are younger than other ready instructions, may significantly improve the performance of a processor. This is because once these types of instructions have been issued they free up other resources which can be used by other instructions.

Accordingly, embodiments described herein relate to methods, reservation stations and processors for prioritizing certain types of instructions even if they are younger than other ready instructions. In particular, in the embodiments described herein instructions are sorted in a reservation station into one of a plurality of instruction queues based on the type of instruction. The reservation station then selects instructions for execution from the instruction queues based on a relative priority of the plurality of types of instructions. This allows certain types of instructions to be prioritized over other instructions even if they are younger than other ready instructions. Selecting instructions in this manner ensures that higher priority instructions are selected for issue over lower priority instructions, thereby guaranteeing the higher priority instructions functional unit resources (e.g. pipelines) and increasing the performance of the processor.

Furthermore, selecting instructions in this manner does not introduce any additional delay in the processor. In particular, even after segregating different types of instructions into separate instruction queues the selection and issuing processes can be completed in a single cycle.

Reference is now made to FIG. 1 which illustrates a single-threaded out-of-order processor 100 wherein certain types of instructions are given priority over other instructions.

The processor 100 comprises a fetch stage 102 configured to fetch instructions from a program (in program order) as indicated by a program counter (PC) and a decode and renaming stage 104 arranged to interpret the instructions and perform register renaming. As is known to those of skill in the art register renaming enables more instructions to be executed out-of-order, by removing certain dependencies, such as write-after-read (WAR) dependencies.

After an instruction passes through the decode and renaming stage 104, it is (a) inserted into a re-order buffer 106 (ROB); and (b) dispatched to one of the reservation stations 108a, 108b or 108c.

The re-order buffer 106 is a buffer that enables the instructions to be executed out-of-order, but committed in-order. The re-order buffer 106 holds the instructions that are inserted into it in program order, but the instructions within the ROB 106 can be executed out of sequence by the functional units 110a, 110b and 110c. Instructions are output from the re-order buffer 106 to a commit stage 112 in program order after they have been executed by the functional units 110a, 110b, and 110c. The commit stage 112 then commits the results of the instruction to the register/memory.

In some examples, the re-order buffer 106 can be formed as a circular buffer having a head pointer pointing to the oldest instruction in the ROB 106 (the head instruction), and a tail pointer pointing to the youngest instruction in the ROB 106 (the tail instruction). In these examples, the head instruction is output from the head of the ROB 106 when that instruction has been executed by the functional units 110a, 110b, and 110c, and the head pointer is incremented to point to the next instruction in the ROB 106.

Each reservation station 108a, 108b and 108c receives instructions from the decode and renaming stage 104 and issues the instructions to a corresponding functional unit 110a, 110b or 110c for execution. Although the processor 100 of FIG. 1 comprises three reservation stations 108a, 108b and 108c other processors may have more or fewer reservation stations.

Furthermore, although FIG. 1 shows a one-to-one relationship between reservation stations 108a, 108b and 108c and functional units 110a, 110b and 110c respectively, in other cases there may be a one-to-many relationship between the reservation stations 108a, 108b and 108c and the functional units 110a, 110b and 110c. For example, in some cases at least one of the reservation stations 108a, 108b or 108c may be configured to provide instructions to a plurality of functional units 110a, 110b and/or 110c. In other cases, there may be only a single reservation station 108a, 108b or 108c that is configured to provide instructions to all of the functional units 110a, 110b and 110c.

In the embodiments described herein each reservation station 108a, 108b and 108c is configured to sort the instructions received from the decode and renaming stage 104 into a plurality of instruction queues based on the type of instruction. Each clock cycle the reservation station 108a, 108b or 108c attempts to select a number of instructions from the instruction queues to issue to the corresponding functional unit 110a, 110b or 110c for execution. In some cases the reservation stations 108a, 108b or 108c are configured to select instructions from the instruction queues to prioritize certain types of instructions over others.

Each functional unit 110a, 110b, and 110c is responsible for executing instructions and may comprise one or more functional unit pipelines. The functional units 110a, 110b, and 110c may be configured to execute specific types of operations or they may be general purpose functional units. For example one or more functional units 110a, 110b and 110c may be a load/store unit, an integer unit, a floating point unit (FPU), a digital signal processing (DSP)/single instruction multiple data (SIMD) unit, or a multiply accumulate (MAC) unit. A load/store unit performs load and store memory operations, an integer unit performs integer operations, an FPU executes floating point operations, a DSP/SIMD unit has multiple processing elements that perform the same operation on multiple data points simultaneously, and a MAC unit computes the product of two numbers and adds that product to an accumulator. The functional units 110a, 110b and 110c and the pipelines therein may have different lengths and/or complexities. For example, a FPU pipeline is typically longer than an integer execution pipeline because it is generally performing more complicated operations.

An example reservation station 108 and associated functional unit 110 will be described with reference to FIG. 2.

The processor 100 also comprises a branch predictor 114, which is configured to predict which direction the program flow will take in the case of instructions known to cause possible flow changes, such as branch instructions. Branch prediction is useful as it enables instructions to be speculatively executed by the processor 100 before the outcome of the branch instruction is known. The branch predictor 114 may be in communication with the fetch stage 102, decode and renaming stage 104, and/or the functional units 110$a$, 110$b$ and 110$c$. For example, the fetch stage 102 may use information from the branch predictor 114 to determine which instruction to fetch next; the decode and renaming stage 104 may provide information to the branch predictor 114 indicating which instructions are branch instructions (in other cases the instructions may be decoded in the fetch stage 102); and the functional units 110$a$, 110$b$ and 110$c$ may provide the branch predictor 114 with information indicating updates to the program counter.

When the branch predictor 114 predicts the program flow accurately, this improves performance of the processor 100. However, if the branch predictor 114 does not correctly predict the branch direction, then a mis-prediction occurs which needs to be corrected before the program can continue. To correct a mis-prediction, the speculative instructions sent to the ROB 106 are abandoned, and the fetch stage 102 starts fetching instructions from the correct program branch.

Figure 2:
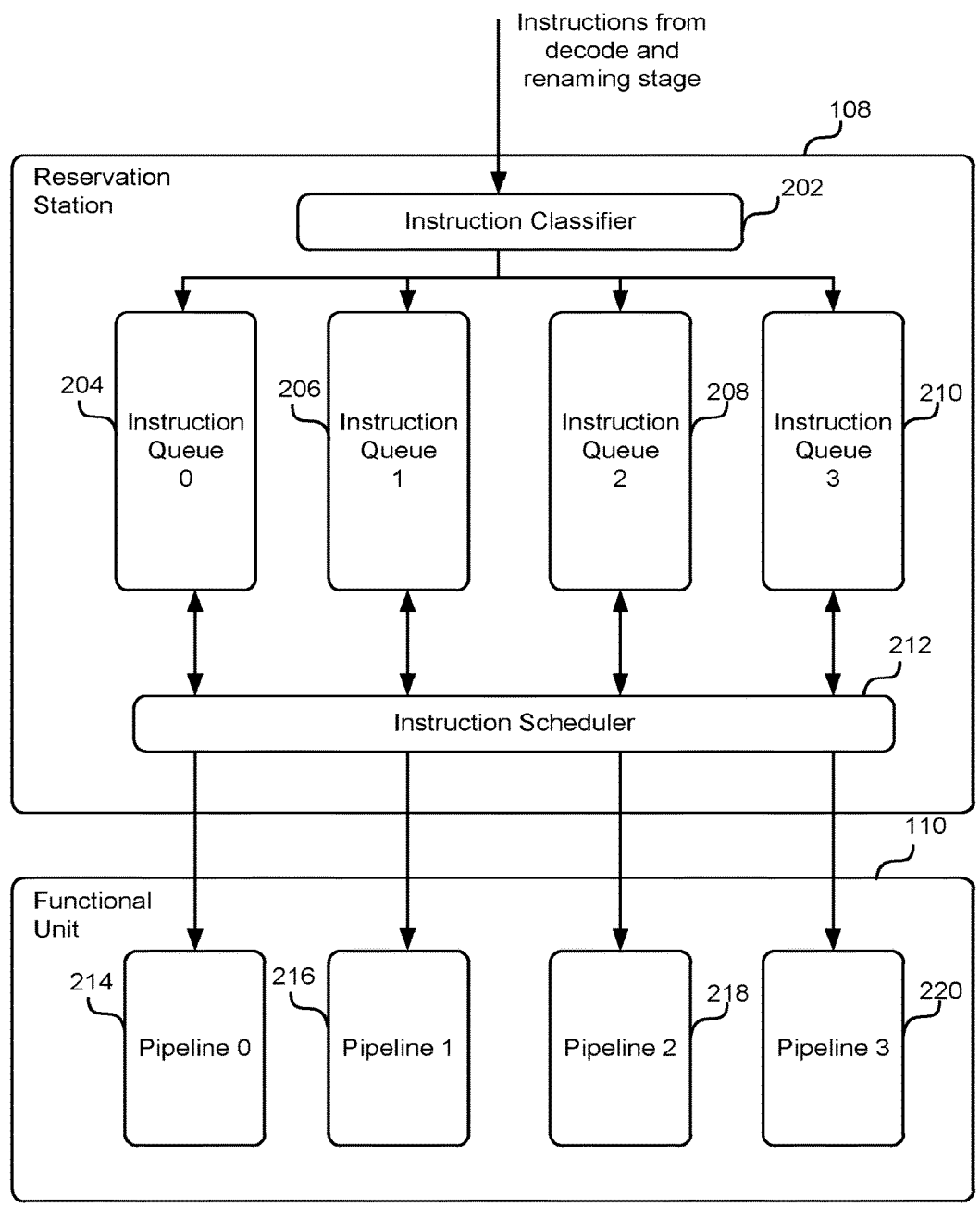
FIG. 2 is a schematic diagram of an example reservation station and associated functional unit of FIG. 1.

Reference is now made to FIG. 2, which illustrates an example reservation station 108 of FIG. 1 and an associated functional unit 110. As described above, the reservation station 108 issues instructions to the functional unit 110 for execution in a manner that prioritizes certain types of instructions over other types of instructions.

The reservation station 110 comprises an instruction classifier 202 for categorizing the instructions received from the decode and renaming stage 104 into one of a plurality of categories based on the type of instruction; a plurality of instruction queues 204-210 for storing instructions in a specific category; and an instruction scheduler 212 for selecting ready instructions from the instruction queues 204-210 and issuing them to the functional unit 110 for execution.

As briefly described above, the instruction classifier 202 receives instructions from the decode and renaming stage 104; classifies each instruction into one of a plurality of categories based on the type of instruction; and sends each classified instruction to the instruction queue 204-210 corresponding to the assigned category. In some cases the decode and renaming stage 104 uses the operation code ("opcode") of the instruction to determine the type of instruction. The decode and renaming stage 104 then provides an indication of the type of instruction in the data provided to the reservation station 108. In other cases the decode and renaming stage 104 provides the opcodes to the reservations station 108 and the instruction classifier 202 uses the opcodes to identify the type of instruction.

In some cases the instruction classifier 202 uses the information received from the decode and renaming stage 104 (e.g. indicator or opcode) to identify at least one of the following types of instructions: control transfer instructions, address generation instructions, and flag setting instructions. Control transfer instructions are instructions, such as branch instructions, that modify the program counter (PC) to alter a program's control flow. Address generation instructions are instructions that resolve the memory address of load and store instructions. It is only after execution of such instructions that a load or store operation can be successfully performed. Flag setting instructions are instructions that modify the condition flags stored in a flag register that indicate the status of the processor.

In other cases the instruction classifier 202 may use the information received from the decode and renaming stage 104 (e.g. indicator or opcode) to identify more, fewer or other types of instructions.

In some cases there may be one category for each type of instruction identified (e.g. a category for control transfer instructions, a category for address generation instructions, and a category for flag setting instructions) and one general category for all other instructions. In other cases there may be one category for one or more types of identified instructions (e.g. a category for control transfer instructions, address generation instructions, and flag setting instructions; or a category for control transfer instructions and a category for address generation and flag setting instructions) and one general category for all other instructions.

Although it has been described herein that the instruction classifier 202 performs the classification of the instructions, in other examples the classification may be performed by another component of the processor 100, such as the decode and renaming stage 104. In these examples, in addition to receiving the instruction itself from the decode and renaming stage 104 the instruction classifier 202 may also receive information indicating which category the instruction has been classified into. The instruction classifier 202 then sends the received instructions to the appropriate instruction queue based on the classification information received from the decode and renaming stage 104.

Each instruction queue 204-210 receives instructions from the instruction classifier 202 for a particular category and stores each instruction in an available entry or slot. The instructions may be stored in the instruction queues in the order in which they are received from the instruction classifier 202. Since the instruction classifier 202 typically receives and processes the instructions from the decode and renaming stage 104 in program order, the instructions may be stored in the instruction queues 204-210 in program order.

There is typically one instruction queue 204-210 for each category. In the example reservation station 108 of FIG. 4 there are four categories of instructions (e.g. one for each type of instruction identified above) thus there are four instruction queues 204-210. For example, the first instruction queue 204 (instruction queue 0) may be for control transfer instructions, the second instruction queue 206 (instruction queue 1) may be for address generation instructions, the third instruction queue 208 (instruction queue 2) may be for flag setting instructions, and the fourth instruction queue 210 (instruction queue 3) may be for all other instructions. However, in other examples, the reservation station 108 may have more or fewer instruction queues.

An instruction waits in the instruction queue until its input operand values are available. In particular, the reservation station 108 may monitor the output of the functional unit(s) 110 to find matches for missing operands (operands with a ready bit set to 0) for each instruction in the instruction queues. Once the reservation station 108 finds a match for a missing operand it sets the ready bit for that operand to 1. In some cases, the reservation station 108 also copies the operand from the functional unit 110 output to the instruction queue. In other cases, the operand value is read from the appropriate register file after the instruction has been issued to the functional unit 110. For example, the first stage of the pipelines 214-220 may be configured to read the operand value from the appropriate register file. This may reduce the number of connections between the functional unit(s) 110 and the reservation station 108 over the cases where the operand values are copied from the functional unit 110 output.

Once all of an instruction's operand values are available the instruction is said to be ready for execution and a ready bit for that instruction may be set indicating that the instruction is ready to be issued to the functional unit 110. An instruction's operand values may be available before the operand values for earlier, older instructions allowing it to leave the instruction queue before those earlier, older instructions.

An example instruction queue 204 will be described with reference to FIG. 3.

The exemplary reservation station 108 of FIG. 2 also comprises an instruction scheduler 212 for issuing ready instructions from the instruction queues 204-210 to the functional unit 110 for execution.

The functional unit 110 comprises one or more like pipelines 214-220 for executing instructions. The exemplary functional unit 110 of FIG. 2 comprises four pipelines 214-220 numbered 0 to 3; however, in other examples the functional unit 110 may comprise more or fewer pipelines.

Each clock cycle the instruction scheduler 212 attempts to provide each pipeline 214-220 with an instruction from one of the instruction queues 204-210. For example, where the functional unit 110 comprises four pipelines 214-220 as shown in FIG. 2, the instruction scheduler 212 attempts to select four ready instructions from the instruction queues 204-210 and issue one of the selected instructions to each pipeline 214-220.

In many out-of-order processors the reservation station comprises only a single instruction queue and the oldest ready instructions in the queue are selected for issue to the pipelines 214-220. Issuing the oldest instructions in the queue as soon as possible ensures that the re-order buffer 106 does not fill up and stall the dispatching of instructions by the decode and renaming stage 104. However, this does not ensure optimum performance of the processor. In particular, it has been identified that executing certain types of instructions (e.g. control transfer instructions, flag setting instructions and address generation instructions) as soon as possible, even if they are younger than other ready instructions may significantly improve the performance of the processor. This is because once these instructions have been issued they free up other resources which can be used by other instructions.

In particular it has been observed that mis-speculated (i.e. incorrectly predicted) control transfer instructions have a costly recovery overhead and therefore executing control transfer instructions as soon as possible, even if they are younger that other ready instructions may lead to significant performance improvement. Similar observations have been made for flag setting and address generation instructions.

Accordingly, the instruction scheduler 212 of FIG. 2 is configured to select ready instructions from the instruction queues 204-210 in a manner that prioritizes certain types of instructions even if they are younger that other ready instructions. In some cases, the instruction queues 204-210 are prioritized from highest priority to lowest priority and the instruction scheduler 212 selects ready instructions from the instruction queues in order of priority. For example, if the instruction queues 204-210 are prioritized in the following order from highest priority to lowest priority—instruction queue 0, instruction queue 1, instruction queue 2 and instruction queue 3—the instruction scheduler 212 may first select ready instructions from instruction queue 0, then instruction queue 1, then instruction queue 2, then instruction queue 3.

In some cases the priority of the instruction queues 204-210 may be predetermined or fixed, and in other cases the priority may be dynamically adjusted.

In particular, in some cases, the priority of the instruction queues 204-210 may be determined by offline-testing and/or performance analysis and then predetermined or fixed in the processor. For example, it is known to those of skill in the art that irrespective of carefully selecting an instruction set architecture (ISA) and micro architecture, performance bottlenecks may be caused by certain instructions (e.g. control transfer instructions). By performing a detailed analysis of the impact of the chosen micro architecture on the performance of benchmark applications of interest, instructions may be prioritized as seen fit on a case-by-case basis. In some cases, the relative priorities of certain instructions may be determined by examining several parameters indicating the status of the processor at any given time.

Detailed analysis has shown that in some cases optimum performance can be achieved if the instruction queue associated with control transfer instructions is given the highest priority, the instruction queue associated with flag setting instructions is given the second highest priority, the instruction queue associated with address generation instructions is given the third highest priority, and the instruction queue associated with all other instructions is given the lowest priority.

In other cases the processor may comprise an additional component, such as the Automatic MIPS allocator (AMA), which monitors the overall performance of the processor and generates appropriate control signals to the instruction scheduler 212 specifying the priority of instruction queues 204-210 to optimize instruction execution in real time.

In some cases if the instruction scheduler 212 is able to select enough ready instructions from a higher priority queue or higher priority queues, then it may not even attempt to select instructions from a lower priority queue. For example, where there are four pipelines in the associated functional unit 110 as shown in FIG. 2 and the instruction scheduler 212 is able to obtain four ready instructions from the highest priority queue (e.g. instruction queue 0) and the second highest priority queue (e.g. instruction queue 1) collectively then the instruction scheduler may not even attempt to select ready instructions from the two lower priority instruction queues (e.g. instruction queue 2 and instruction queue 3).

The instruction scheduler 212 is typically configured to select the oldest ready instructions from any particular instruction queue 204-210, however, in some cases the instruction scheduler 212 may be configured to select instructions from a particular instruction queue using other criteria. Selecting instructions using other criteria may, however, slow down the instruction scheduler 212 (and exceed the single clock cycle time period) if a complex set of rules and exceptions are used. In some cases the instruction scheduler 212 may select instructions from different instruction queues using different criteria (i.e. it may select the oldest ready instructions from one queue and use other criteria to select instructions from another queue), however, this may increase the complexity of the instruction scheduler 212 and/or make it slower.

In some cases, the number of instructions that may be selected from a particular instruction queue in a clock cycle may be limited. This may be done (a) because there are minimal performance benefits for prioritizing more than one instructions of a certain type; and/or (b) to preempt the possibility of one or more low priority queues being starved (e.g. instructions in a particular queue are never issued to the functional unit 110). For example, where the reservation station 108 has an instruction queue dedicated to control transfer instructions, the instruction scheduler 212 may be configured to select a maximum of one ready instruction from the control transfer instruction queue in any clock cycle. This is because it has been identified that since a second control transfer instruction is likely to be much younger than the first control transfer instruction the performance benefits for prioritizing more than one control transfer instruction is not large compared to issuing more older instructions from another instruction queue.

When selecting instructions to issue to the functional unit, the instruction scheduler 212 assesses a plurality of instructions to determine if they are eligible for issue. Generally an instruction is eligible for issue if the instruction is ready and has not been issued. Determining whether an instruction is ready and has not been issued may comprise looking at a ready column and an issue column (as described in reference to FIG. 3) of the instruction queue. However, the instruction scheduler 212 can only typically assess a maximum number of instructions, $W_{max}$, per clock cycle depending on the processor 100 clock frequency.

In some cases, to ensure that the instruction scheduler can assess instructions from all instruction queues 204-210 in one clock cycle, the number of instructions that can be assessed in any given instruction queue is limited to a maximum number $W_i$ where i is the instruction queue number. For example, a maximum of $W_0$ instructions may be assessed in the first instruction queue 204 (instruction queue 0), and a maximum of $W_1$ instructions may be assessed in the second instruction queue 206 (instruction queue 1). The limits imposed on the instruction queues 204-210 may be the same or different.

Irrespective of whether the maximums are the same or different across instruction queues, the sum of the maximums ($W_i$) cannot exceed the maximum number of instructions ($W_{max}$) that can be assessed by the instruction scheduler 212 in any one cycle. This is represented by equation (1) shown below where X is the number of instruction queues.

$$\sum_{i=0}^{i=X-1} W_i \leq W_{max} \quad (1)$$

Where there is a limit ($W_i$) on the number of instructions that can be assessed in a particular instruction queue 204-210, when the instruction scheduler 212 is selecting ready instructions from the particular instruction queue 204-210 the instruction scheduler 212 may instructions in the particular instruction queue when the instruction scheduler 212 has assessed the maximum number of instructions ($W_i$) for that particular instruction queue. Once it stops assessing instructions in a particular queue it may move to the next highest priority instruction queue to look for instructions to issue to the functional unit 110.

A method for selecting instructions from the plurality of instruction queues that may be implemented by the instruction scheduler 212 is described with reference to FIG. 4.

Reference is now made to FIG. 3 which illustrates an example instruction queue 204 of FIG. 2. The instruction queue 204 may be configured as a table with a number of rows 302-332 and columns 334-338. Each row or entry 302-332 may hold information related to a single instruction. In some cases the instructions are stored in the instruction queue 204 in the order in which they are received. Since the instruction classifier 202 typically receives and processes the instructions from the decode and renaming stage 104 in program order, the instructions may be received and stored by the instruction queue 204 in program order. Accordingly, older instructions will be inserted before younger instructions. In the example shown in FIG. 3, instruction 0 is the oldest instruction and instruction 15 is the youngest instruction.

The columns 334-338 are used to store specific information for each instruction. In the example shown in FIG. 3 there are three columns: an instruction column, a ready column and an issued column, however, in other examples there may be more, fewer, or different columns. For example, in some embodiments (e.g. where instructions are removed from the instruction queue as soon as they have been issued), the instruction queues may not comprise an issued column.

The instruction column 334 is used to hold information describing the instruction which is used by the functional unit 110 (e.g. pipeline) to execute the instruction. This information may comprise the instruction codes and input and output operands for the instruction. The instruction column 334 may be implemented in any suitable manner.

The ready column 336 is used to indicate whether the instruction is ready to be issued to the functional unit 110. As described above, an instruction is said to be ready for issue to the functional unit 110 when all of its input operands are available. The ready column 336 may be implemented in any suitable manner. For example, in some cases the ready column 336 may be implemented as a single bit and in other cases the ready column 336 may be implemented as a Boolean value. When an instruction is initially received from the instruction classifier 202 its operand values are not typically available. Accordingly the ready column may initially be set (e.g. to "0" or "FALSE") to indicate that the instruction is not ready. When the input operands subsequently become available the ready column may be set (e.g. to "1" or "TRUE") to indicate that the instruction is ready to be issued to the functional unit 110.

The issued column 338 is used to indicate whether the instruction has been issued to the functional unit 110. The issued column 338 may be implemented in any suitable manner. For example, in some cases the issued column 338 may be implemented as a single bit and in other cases the issued column 338 may be implemented as a Boolean value. When an instruction is initially received from the instruction classifier 202 the issued column may be set (e.g. to "0" or FALSE) to indicate that the instruction has not been issued to the functional unit 110. Once the instruction has been issued the issued column 338 may be set (e.g. to "1" or "TRUE") to indicate that the instruction has been issued to the functional unit 110.

An instruction may remain in the instruction queue 204 until (i) it has been issued; or (ii) until it has been issued and subsequently overwritten by another instruction.

An instruction is typically only selected for issue to the functional unit 110 if the instruction is ready and it has not been issued to the functional unit 110.

Where the number of instructions, $W_O$, in the instruction queue 204 (instruction queue 0) that may be assessed by the instruction scheduler 212 in a clock cycle is limited, a window may be established to define the $W_O$ instructions to be assessed. The window may be defined by a head pointer which points to the head instruction (also referred to as the start instruction) and a tail pointer which points to the tail instruction (also referred to as the end instruction). In some cases the head instruction may be the oldest instruction in the instruction queue 204 that has not been issued, and the tail instruction may be the $(W_O-1)^{th}$ instruction in the instruction queue 204 immediately following the head instruction.

A first example is used to illustrate this concept. In particular, if a maximum of four instructions can be assessed in the instruction queue 204 of FIG. 3 (e.g. $W_O=4$), the head pointer 340 of the window may point to instruction 2 (head instruction) since this is the oldest non-issued instruction in the instruction queue 204, and the tail pointer 342 of the window may point to instruction 5 (tail instruction) since it is the third (e.g. $W_O-=4-1=3$) instruction immediately following the head instruction. In this example, when the instruction scheduler 212 attempts to select instructions from this instruction queue 204 (e.g. instruction queue 0) the instruction scheduler 212 assesses instructions 2 to 5 one at a time until: (a) it has selected enough ready instructions to fill the pipelines (e.g. one per pipeline), (b) it has selected the maximum number of instructions from this queue (if a maximum has been assigned to this instruction queue), or (c) it has assessed instruction 5 (e.g. it has assessed the maximum number of instruction for this instruction queue). Once one of these conditions is met the instruction scheduler 212 stops searching the instruction queue 204 for instructions to issue. If condition (a) is met the instruction scheduler 212 may issue the selected instructions to the functional unit 110. If, however, condition (b) or (c) is met, the instruction scheduler 212 may move to the next lower priority instruction queue (if there is a lower priority instruction queue) to continue looking for instructions to issue to the functional unit 110.

In other cases the head instruction of the window may be the oldest ready non-issued instruction in the instruction queue 204, and the tail instruction of the window may be the $(W_i-1)^{th}$ instruction in the instruction queue immediately following the head instruction. These cases may require more logic than the cases where the head instruction of the window is the oldest non-issued instruction in the instruction queue 204, but it may result in a more efficient use of the instruction scheduler's 212 resources since the instruction scheduler 212 does not waste time assessing older instructions that are not ready for issue.

A second example is used to illustrate this concept. In particular, if a maximum of seven instructions can be assessed in the instruction queue 204 of FIG. 3 (e.g. $W_O=7$), the head pointer 344 of the window may point to instruction 3 (head instruction) since this is the oldest ready non-issued instruction in the instruction queue 204, and the tail pointer 346 of the window may point to instruction 9 (tail instruction) since it is the sixth (e.g. $W_O-1=7-1=6$) instruction in the instruction queue 204 immediately following the head instruction. In this example, when the instruction scheduler 212 attempts to select instructions from this instruction queue 204 (e.g. instruction queue 0) the instruction scheduler 212 assesses instructions 3 to 9 one at a time until one of the following conditions is met: (a) it has selected enough ready instructions to fill the pipelines (e.g. one per pipeline), (b) it has selected the maximum number of instructions from this queue (if a maximum has been assigned to this instruction queue), or (c) it has assessed instruction 9 (e.g. it has assessed the maximum number of instructions for this queue). Once one of these conditions is met the instruction scheduler 212 stops searching the instruction queue for instructions to issue. If condition (a) is met the instruction scheduler 212 may issue the selected instructions to the functional unit 110. If, however, conditions (b) or (c) are met, the instruction scheduler 212 may move to the next lower priority instruction queue (if there is a lower priority instruction queue) to look for additional instructions to issue to the functional unit 110.

Figure 4:
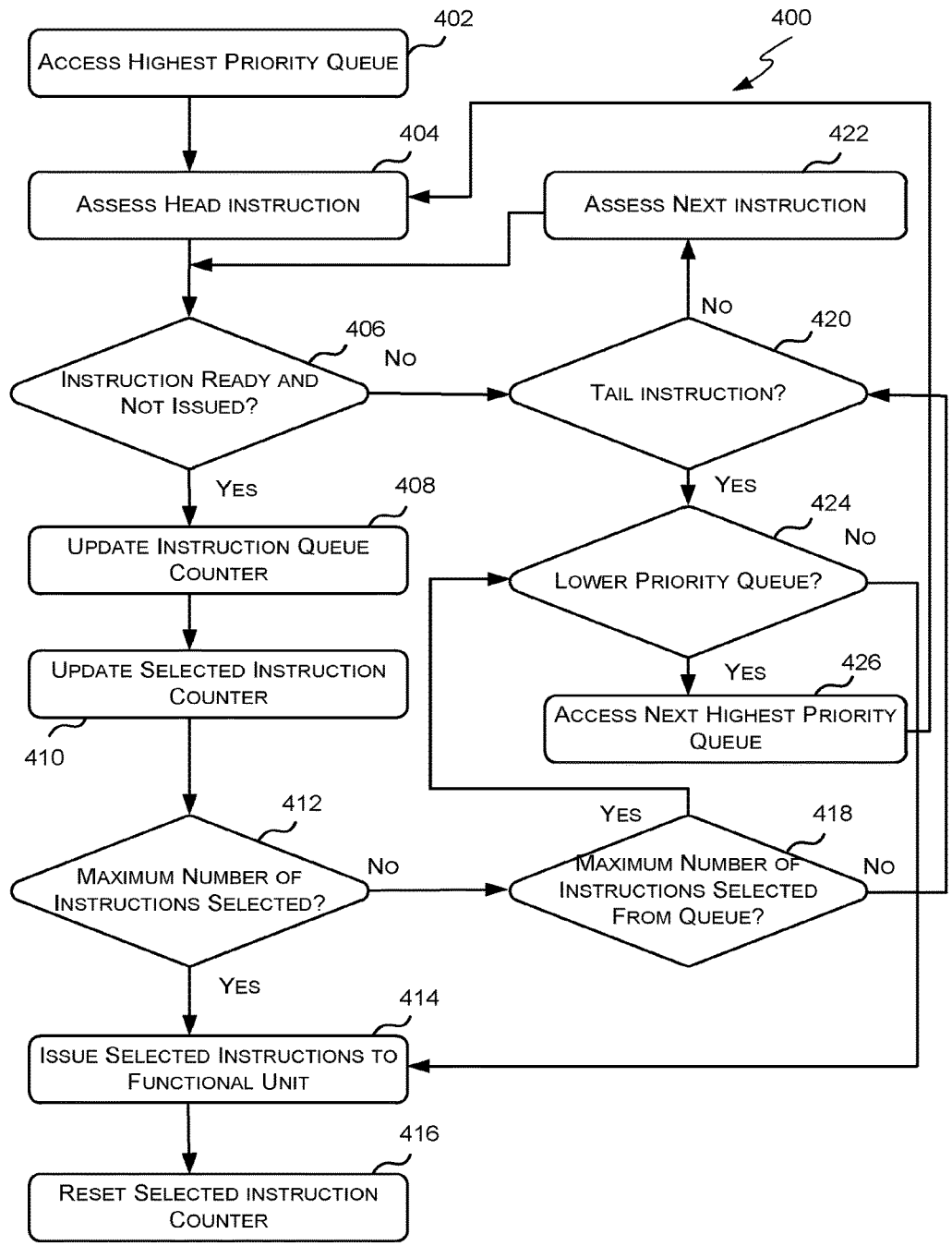
FIG. 4 is flowchart of an example method for selecting instructions to issue to a functional unit.

Reference is now made to FIG. 4 which illustrates a method 400, which may be performed by the instruction scheduler 212 of FIG. 2, for selecting instructions from the instruction queues 204-210 to issue to a functional unit 110. In the method 400 of FIG. 4 the instruction scheduler 212 searches the instruction queues 204-210 in order of priority for ready instructions to issue to the functional unit 110.

The instruction scheduler 212 may stop searching a particular queue if any one of the following conditions are met: (a) the maximum number of instructions have been selected (e.g. the number of selected instructions is equal to the number of pipelines in the functional unit); (b) the maximum number of instructions for the particular queue have been selected (e.g. an instruction queue may have a limit on the number of instructions that can be selected from that instruction queue); and (c) the maximum number of instructions for the particular queue have been assessed (e.g. an instruction queue may have a limit on the number of instructions in that instruction queue that can be assessed in a clock cycle). If condition (a) is met the instruction scheduler 212 may issue the selected instructions to the functional unit 110. If, however, condition (b) or (c) is met, the instruction scheduler 212 may proceed to the next highest priority instruction queue to search for ready instructions to issue.

Condition (b) may only apply if a limit on the number of selected instructions has been imposed on the particular queue being searched. Similarly, condition (c) may only apply if a limit on the number of instructions that may be assessed has been imposed on the particular queue being searched.

This is described in more detail below in reference to steps 402 to 426.

At step 402, the instruction scheduler 212 accesses the instruction queue with the highest priority. Using FIG. 2 as an example, if instruction queues 204-210 are prioritized in the following order from highest priority to lowest priority—instruction queue 0, instruction queue 1, instruction queue 2 and instruction queue 3—the instruction scheduler 212 accesses instruction queue 0. Once the instruction scheduler 212 accesses the instruction queue with the highest priority the method 400 proceeds to step 404.

At step 404, the instruction scheduler 212 assesses the start or head instruction to determine if it should be selected for issue to the functional unit 110. As described above in reference to FIG. 3, in some cases the head instruction may be the oldest non-issued instruction in the instruction queue (e.g. instruction 2 of FIG. 3). In other cases the head instruction may be the oldest ready non-issued instruction in the instruction queue (e.g. instruction 3 of FIG. 3). Once the instruction scheduler has assessed the head instruction the method 400 proceeds to step 406.

At step 406 the instruction scheduler 212 determines whether the instruction assessed in step 404 is ready (e.g. it is ready to be issued to the functional unit 110 for execution) and not issued (e.g. it has not already been issued to the functional unit 110 for execution). If the instruction is ready and not issued then the method proceeds to step 408. If, however, the instruction is not ready or already issued then the method proceeds to step 420.

At step 408, the instruction scheduler 212 selects the instruction assessed in step 404 for issue to the functional unit 110 and updates an instruction queue counter. The instruction queue counter keeps track of the number of instructions that have been selected from the instruction queue currently being accessed (the "current instruction queue"). In some cases, updating the instruction queue counter may comprise incrementing the instruction queue counter. Once the instruction queue counter is updated the method 400 proceeds to step 410.

At step 410, the instruction scheduler 212 updates a selected instruction counter. The selected instruction counter keeps track of the number of instructions that have been selected for issue from all instruction queues. In some cases, updating the selected instruction counter comprises incrementing the selected instruction counter. Once the selected instruction counter is updated the method 400 proceeds to step 412.

At step 412, the instruction scheduler 212 determines whether a maximum number of instructions have been selected from all the instruction queues. The maximum number of instructions that can be selected in any clock cycle is typically equal to the number of pipelines (e.g. pipelines 214-220) in the associated functional unit 110. This is because only one instruction can be issued to each pipeline (e.g. pipelines 214-220) in a clock cycle. Accordingly, if the functional unit 110 has four pipelines 214-220 as shown in FIG. 2 the maximum number of instructions may be equal to four.

Determining whether the maximum number of instructions has been selected may comprise comparing the selected instruction counter to the number of pipelines. If the selected instruction counter is equal to the number of pipelines then the instruction scheduler 212 stops looking for more instructions and issues the selected instructions to the pipelines. If, however, the selected instruction counter is less than the number of pipelines than the instruction scheduler 212 may continue to look for instructions to issue to the functional unit 110.

If it is determined that the maximum number of instructions has been selected then the method 400 proceeds to step 414. If, however, it is determined that the maximum number of instructions has not been selected then the method 400 proceeds to step 418.

At step 414, the selected instructions are issued to the functional unit 110 for execution. In some cases the instruction scheduler 212 attempts to issue one selected instruction to each of the pipelines 214-220 of the functional unit 110. For example, if there are four pipelines as shown in FIG. 2 and four instructions were selected then one selected instruction is issued to each pipeline. If, however, there are four pipelines and only three instructions were selected then one selected instruction is issued to each of three of the pipelines.

It does not generally matter which instruction is issued to which pipeline. However, in some cases it may be beneficial to issue instructions that require additional or special resources to a specific pipeline or set of pipelines.

For example, in some cases it may be beneficial to issue control transfer instructions, such as branch instructions, to a specific pipeline or set of pipelines to reduce the cost of book-keeping and synchronization between the available pipelines. In particular, control transfer instructions may be issued to a specific pipeline so as to minimize and/or eliminate the book-keeping and synchronization required between the pipelines to track the 'squashing' of control transfer instructions (in case their input operands are not actually ready at execution time); and prevent younger control transfer instructions from overtaking older control transfer instructions.

At step 416, the selected instruction counter is reset (e.g. zeroed). Once the instruction counter has been reset, the method 400 ends.

At step 418, after an instruction has been selected for issue and it has been determined that the maximum number of instructions from all instruction queues has not yet been selected, the instruction scheduler 212 determines whether the maximum number of instructions has been selected from the instruction queue currently being accessed.

Determining whether the maximum number of instructions for the instruction queue currently being accessed have been selected may comprise comparing the instruction queue counter to the maximum number of instructions that may be selected from the current instruction queue. If the instruction queue counter is equal to the maximum number of instructions then the instruction scheduler 212 may stop looking for more instructions from this instruction queue. If, however, the instruction queue counter is less than the maximum number of instructions the instruction scheduler 212 may continue to look for instructions from this instruction queue to issue to the functional unit 110.

If it is determined that the maximum number of instructions has been selected from this instruction queue then the method 400 proceeds to step 424 where the instruction scheduler 212 may continue to look for instructions from another instruction queue. If, however, it is determined that the maximum number of instructions has not been selected from this instruction queue then the method 400 proceeds to step 420 where the instruction scheduler 212 may continue to search for instructions from the current instruction queue.

Step 418 is optional. In particular, it only applies to an instruction queue where the number of instructions that may be selected from that instruction queue in a particular clock cycle has been limited. If the number of instructions that may be selected from the current instruction queue has not been limited then step 418 may not be executed and the method 400 may proceed directly to step 420.

At step 420, after an instruction has been selected for issue and it has been determined that the maximum number of instructions from all instructions has not been selected, and the maximum number of instructions from the current instruction queue has not been selected; or after an instruction has been assessed, but not selected; the instruction scheduler 212 determines whether the most recently assessed instruction is the tail instruction. As described above, the tail instruction is the $(W_i-1)^{th}$ instruction following the head instruction where $W_i$ is the maximum number of instructions that can be assessed in the $i^{th}$ instruction queue in a clock cycle. If the most recently assessed instruction is the tail instruction then the maximum number of instructions that may be assessed in the current instruction queue has been reached.

If it is determined that the maximum number of instructions has been assessed then the method 400 proceeds to step 424 where the instruction scheduler 212 may continue to search for instructions from another instruction queue. If, however, it is determined that the maximum number of instructions has not been assessed then the method 400 proceeds to step 422 where the instruction scheduler 212 continues to look for instructions from this instruction queue.

Step 420 is optional. In particular, it only applies to those instruction queues where a limit has been imposed on the number of instructions that may be assessed in a clock cycle. If the number of instructions that may be assessed in the current instruction queue has not been limited then step 420 may not be executed and the method may proceed directly to step 422.

At step 422, the next instruction in the current instruction queue is assessed. In some cases the next instruction is the instruction in the current instruction queue immediately following the most recently assessed instruction. Once the next instruction has been assessed the method proceeds back to step 406.

At step 424, after (a) an instruction has been selected for issue and it has been determined that the maximum number of instructions from all instruction queues has not been selected, but the maximum number of instructions for the current instruction queue has been selected; or (b) the maximum number of instructions for the current instruction queue have been assessed, the instruction scheduler 212 determines whether there are any instruction queues lower in priority than the current instruction queue.

If there is at least one instruction queue lower in priority than the current instruction queue, the method 400 proceeds to step 426 where the instruction scheduler 212 looks for instructions in the next highest priority instruction queue. If, however, there are no more instruction queues lower in priority than the current instruction queue, the method 400 proceeds to step 414 where the selected instructions are issued to the functional unit 110.

At step 426, the instruction scheduler 212 accesses the next highest priority instruction queue with respect to the current instruction queue. Once the instruction scheduler 212 has accessed the next highest priority instruction queue, the method proceeds to step 404 where the instructions in the instruction queue are assessed to determine if they are suitable for issue to the functional unit 110.

Method 400 may be repeated each clock cycle.

While method 400 describes that the instruction scheduler 212 accesses the queues sequentially based on priority and assesses the instructions in a particular queue sequentially, in other examples the instruction scheduler may comprise hardware that: (i) speeds up the assessment of instructions in a particular queue by allowing the instruction scheduler 212 to determine information about the next instruction in the queue while assessing the current instruction; (ii) allows it to assess multiple instructions in a queue in parallel; and/or (ii) allows it to access and assess instructions in multiple queues in parallel.

In other examples, the instruction scheduler 212 may use standard selection logic (e.g. as described in 'Delay Evaluation of Issue Queue in Superscalar Processors with Banking Tag RAM and Correct Critical Path Identification' by Yamaguchi et al, published in IEICE TRANS. INF. & SYST., VOL. E95-D, NO.9 SEP. 2012) to select instructions from within each queue such that a total of N instructions are selected every cycle (one for each pipeline). While the examples described above relate to single-threaded out-of-order processors, the methods and principles described herein may equally be applied to multi-threaded out-of-order processors.

Figure 5:
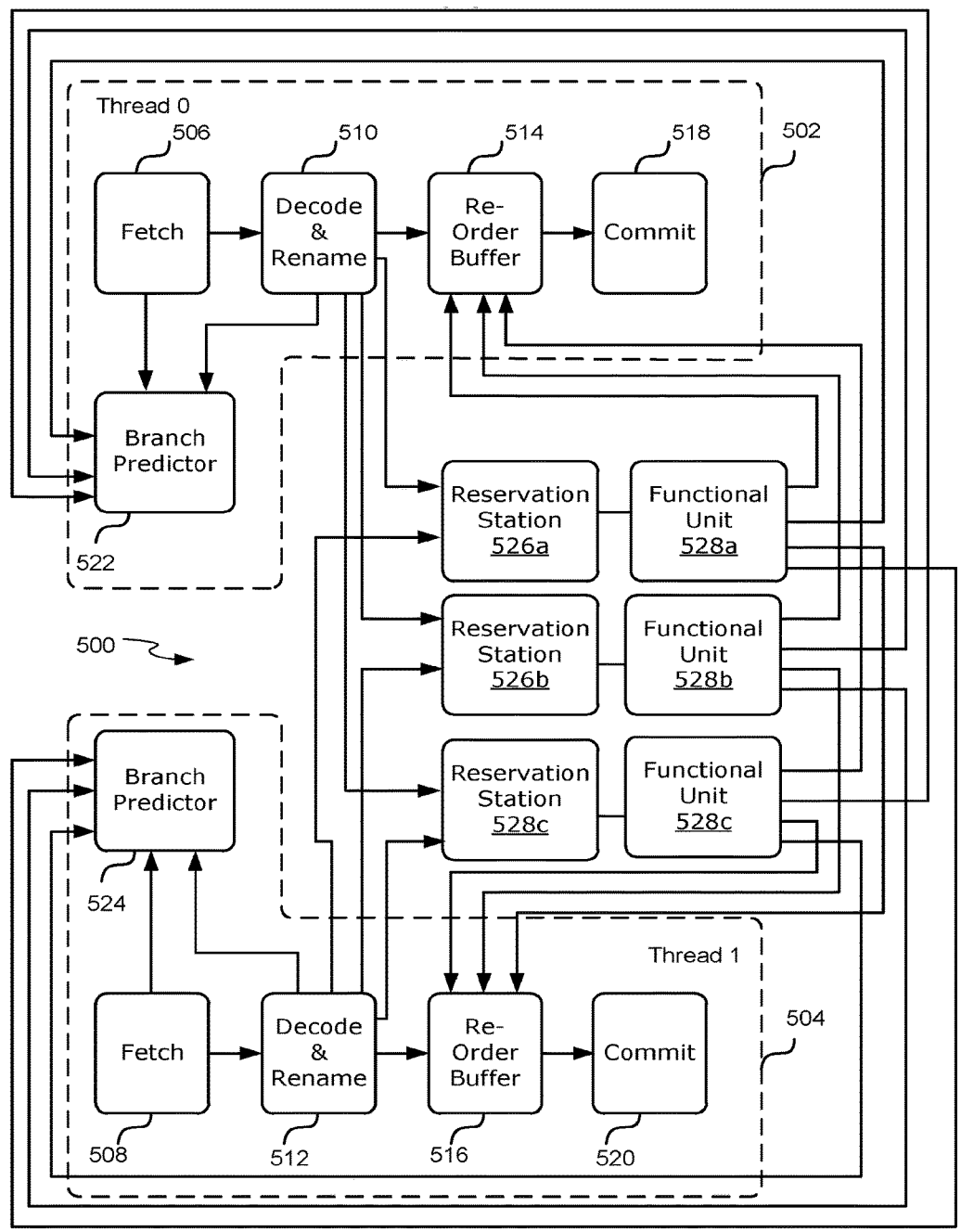
FIG. 5 is a schematic diagram of an example multi-threaded out-of-order processor.

Reference is now made to FIG. 5 which illustrates a schematic of a multi-threaded out-of-order processor 500. The processor 500 comprises two threads 502 and 504 which will be referred to herein as thread 0 and thread 1 respectively. Each thread 502 and 504 comprises a fetch stage 506 or 508, a decode and renaming stage 510 or 512, a re-order buffer 514 or 516, a commit stage 518 or 520, and a branch predictor 522 or 524 as described above in reference to FIG. 1. The threads 502 and 504 share the reservation stations 526*a*, 526*b* and 526*c*, and functional units 528*a*, 528*b* and 528*c* as described above in reference to FIG. 1. Also as described above, each functional unit 528*a*, 528*b* and 528*c* may comprise one or more pipelines (not shown) for executing the instructions issued to the functional unit 528*a*, 528*b* or 528*c*.

Each decode and renaming stage 510 and 512 analyzes each fetched instruction and then dispatches the instruction to the appropriate reservation station 526*a*, 526*b* or 526*c*. In accordance with the principles and methods described above in reference to FIGS. 2 to 4, each reservation 510 and 512 sorts the received instructions into a plurality of categories based on the type of instruction; stores each category of instructions into a separate instruction queue; selects instructions from the instruction queues in a manner that prioritizes certain types of instructions over other instructions even if they are younger than the other instructions; and issues the selected instructions to the associated functional unit 528*a*, 528*b* or 528*c*.

Figure 6:
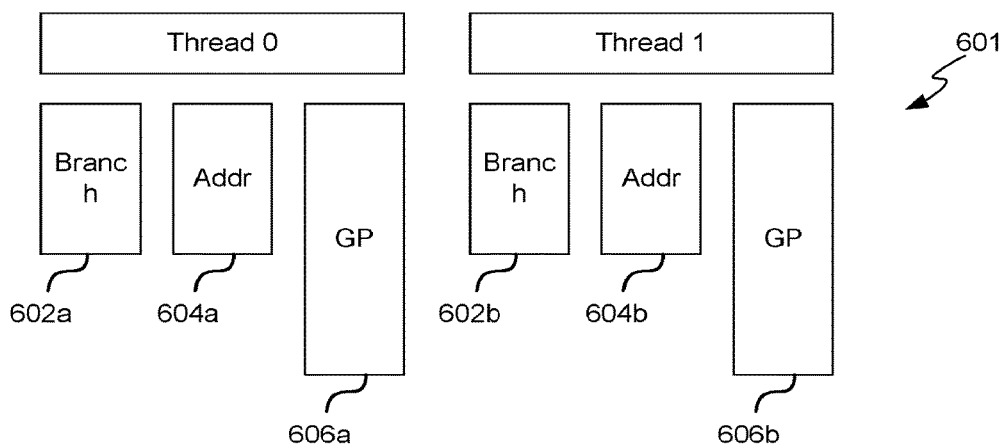
FIG. 6 is a schematic diagram showing example queues for a multi-threaded out-of-order processor.
Figure 6:
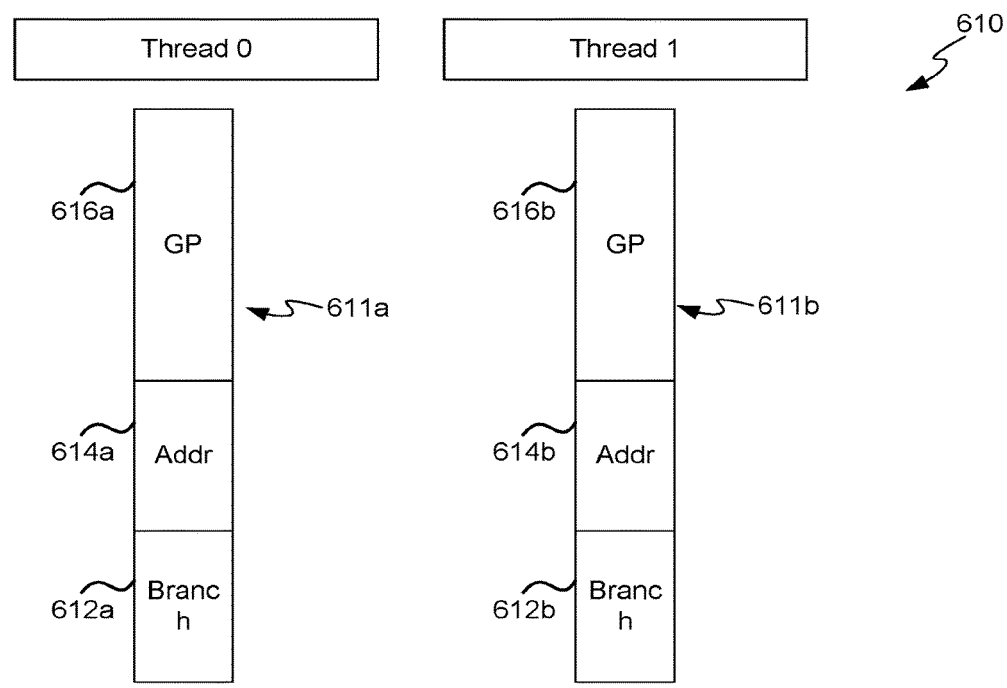

In some cases, each thread may have a separate set of categories and associated instruction queues, although the sets of categories may be the same for each thread (e.g. a category for control transfer instructions, a category for address generation instructions, a category for flag setting instructions and a category for general purpose instructions). An example of these different queues are shown in the upper schematic diagram 601 in FIG. 6. In this example there are two threads, thread 0 and thread 1 and three queues 602*a*-606*a*, 602*b*-606*b* for each thread, one for branch instructions (queues 602*a*, 602*b*), one for address generation instructions (queues 604*a*, 604*b*) and one for general purpose (GP) instructions (queues 606*a*, 606*b*). In these cases there may be one instruction scheduler for each thread that selects instructions from its associated instruction queues in accordance with the principles described above in reference to FIGS. 2 to 4. In these cases the reservation stations 526*a*, 526*b* and 526*c* may also comprise an arbitration unit (not shown) that selects instructions from the two threads in accordance with a set of rules. For example, the arbitration unit may select instructions from the two threads based on how speculative each thread's instructions are as described in co-pending UK patent application "ALLOCATING RESOURCES TO THREADS BASED ON SPECULATION METRIC" Jackson et al. filed on 21 Jan. 2013.

In an example scenario for a multi-threaded processor (or processor core), there may be two threads (thread 0 and thread 1) and 4 queues for thread 0 and 4 queues for thread 1 (e.g. one queue for each of four categories: control transfer instructions, address generation instructions, flag setting instructions and general purpose instructions). In this example there may be 4 pipelines which are shared between thread 0 and thread 1 and so generally 2 pipelines are available for thread 0 and 2 pipelines are available for thread 1.

Starting with thread 0, one instruction from each queue may be issued into each of the 2 pipelines available for thread 0 or if there are additional ready instructions in a higher priority queue, there may be more than one instruction issued from that queue, resulting in no instructions being issued from one or more lowest priority queues (e.g. 1 instructions from the highest priority queue, 1 instruction from the second highest priority queue and no instructions from the remaining two lower priority queues). Similarly, instructions for thread 1 are issued from one or more of the 4 queues for thread 1 based on the relative priority of these queues. If either thread does not have sufficient ready instructions, the other thread takes up its pipelines (e.g. if thread 0 only has 1 ready instructions, thread 1 may issue 3 instructions).

Although this is described in terms of issuing ready instructions from the separate queues in order of priority, this is conceptually equivalent to combining all eligible instructions for a thread into one queue, with the instructions being arranged in order of priority of their category and issuing from that queue. This process is done for each thread and is represented graphically in the lower schematic diagram 610 in FIG. 6. In this lower diagram, each consolidated queue 611a, 611b for each thread comprises ready instructions from each of the separate queues 602a-606a, 602b-606b (in the upper diagram 601) with the instructions being ordered based on the relative priority of the separate queues, e.g. ready branch instructions 612a, 612b (from queues 602a, 602b) followed by ready address generation instructions 614a, 614b (from queues 604a, 604b) followed by ready general purpose instructions 616a, 616b (from queues 606a, 606b).

Generally it does not matter which instruction is issued to which pipeline. However, in some cases instructions from a particular thread may be issued to the pipelines in a predetermined order. For example, if there are four pipelines numbered 0 to 3 any instructions selected from the first thread (e.g. thread 0) may be first issued to the first pipeline (e.g. pipeline 0) and then to subsequent pipelines (e.g. pipeline 1) in ascending order; and any instructions selected from the second thread (e.g. thread 1) may be first issued to the last pipeline (e.g. pipeline 3) and then to subsequent pipelines (e.g. pipeline 2) in descending order.

Since each pipeline in the functional units 528a, 528b and 528c can end up with instructions from more than one thread, when the instruction scheduler issues instructions to the pipelines it may also provide the pipelines with an indication of which thread the instruction is associated with. Then, if an incorrectly predicted instruction occurs requiring a rewind of the pipelines, the pipelines can rewind or flush only those instructions that are associated with the thread with the incorrectly predicted instruction instead of rewinding all instructions. In some cases the incorrectly predicted instruction may be allowed to continue in the pipeline until all of the instructions up until the incorrectly predicted instruction have been executed. At that point all instructions in the pipelines and the reservation station 526a, 526b or 526c from the particular thread have occurred after the incorrectly predicted instruction and need to be rewound or flushed.

Figure 7:
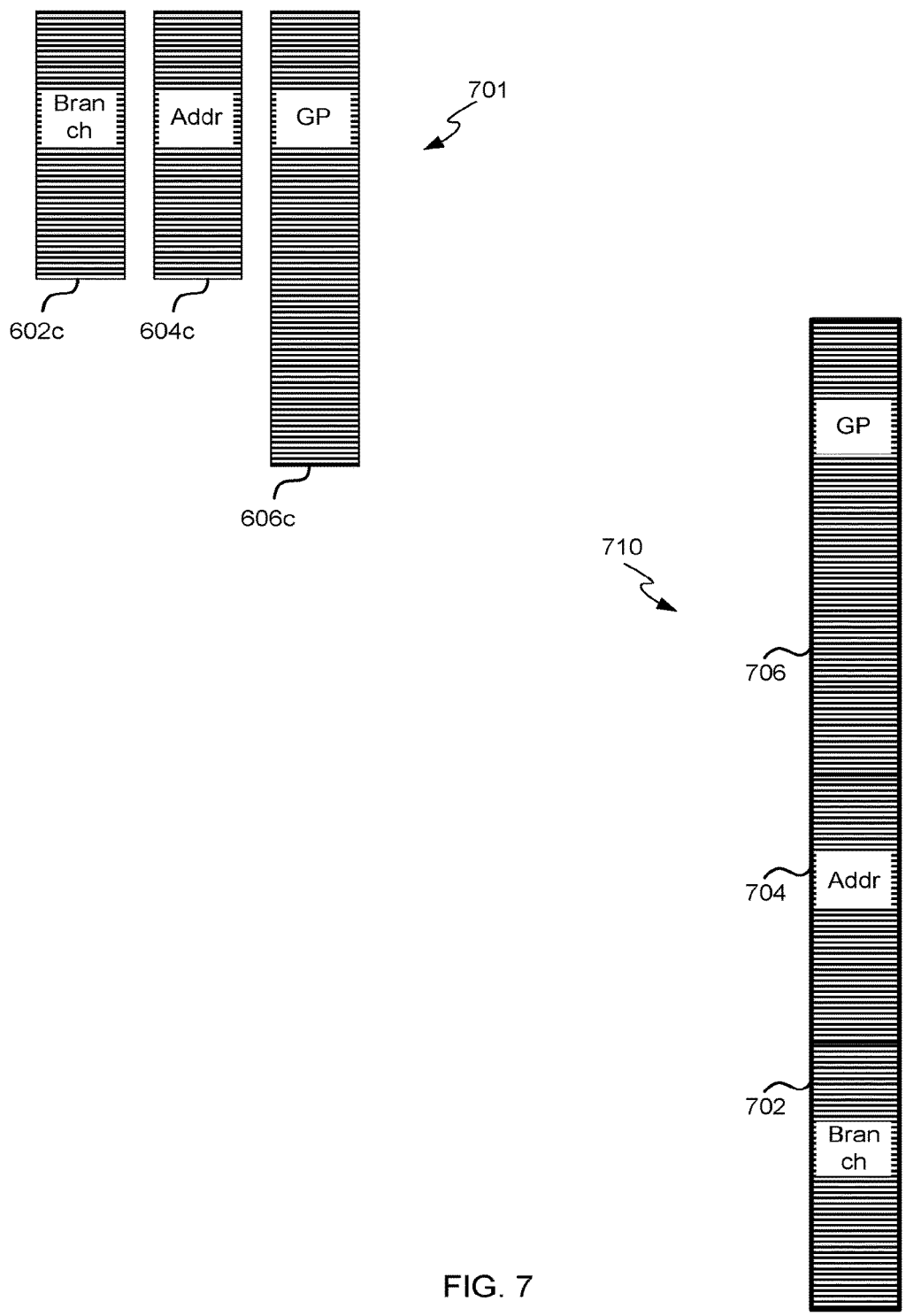
FIG. 7 is a schematic diagram showing example interleaved queues for a multi-threaded out-of-order processor.

In a variation of the methods described above and for multi-threaded processors (or processor cores), instructions of the same category but for different threads may combined to form a single queue for the category by interleaving the instructions from the separate queues for each category. This may be described with reference to FIG. 7. In the upper diagram 601 of FIG. 6 (described above) there is one queue for each thread and for each category; however, as shown in the upper diagram 701 in FIG. 7, there is one queue for all threads for each category: one queue for branch instructions 602c, one queue for address generation instructions 604c and one queue for general purpose instructions 606c. As indicated by the striping on each queue 602c, 604c, 606c in FIG. 7, these queues comprise interleaved instructions from the two threads, thread 0 and thread 1.

By combining the queues for the threads in this way (i.e. by interleaving), it is possible to prioritize instructions of a particular category (from both thread 0 and thread 1) over all other instructions from either thread. When selecting instructions to schedule, the instruction scheduler assesses the interleaved queues in order of decreasing priority and selects instructions for issue using the methods described above.

This can be further described using the same example scenario as above with 2 threads (thread 0 and thread 1) 4 pipelines, 4 queues for thread 0 and 4 queues for thread 1. The 4 pipelines are shared between the thread 0 and thread 1, but there is no reservation of 2 pipelines for thread 0 and 2 for thread 1.

In determining which instructions to issue, the interleaved queues are assessed in order of decreasing priority, so, for example, if 1 branch instructions from thread 0 and 3 branch instructions from thread 1 were ready to be issued, then all 4 branch instructions would be issued that cycle. In contrast, without interleaving, 1 branch instruction would be issued from thread 0, then an address generation instruction from thread 0 and 2 branch instructions from thread 1.

By interleaving instructions from each thread, both threads have equal priority and instructions are issued based on the relative priority of the queues (or the categories which define the queues).

In a similar manner to the earlier example, although this is described in terms of issuing ready instructions from the separate queues (602c, 604c, 606c) in order of priority, this is conceptually equivalent to combining all eligible instructions for all threads into one queue, with the instructions being arranged in order of priority of their category and being interleaved (for the different threads within each category) and issuing from that queue. This process is represented graphically in the lower schematic diagram 710 in FIG. 7. In this lower diagram, each consolidated queue comprises ready instructions from each of the separate queues 602c-606c (in the upper diagram 701) with the instructions being ordered based on the relative priority of the separate queues, e.g. interleaved ready branch instructions 702 (from queue 602c) followed by interleaved ready address generation instructions 704 (from queue 604c) followed by interleaved ready general purpose instructions 706 (from queue 606c).

Using the interleaving of instructions from each thread, as described above, resources can be dedicated and instructions prioritized based on the instruction type (e.g. based on the category); whilst still giving each thread equal priority within a category. Otherwise, if interleaving is not used, less critical instructions from one thread may be issued ahead of higher priority instructions from another thread, because the instruction scheduler attempts to share resources equally between threads unless there are insufficient ready instructions. The interleaving, as described with reference to FIGS. 6 and 7 may therefore result in improved performance of the processor.

It will be appreciated that there may be no real interleaved queue in hardware when implementing the methods described above; however, the interleaved queues described conceptually the way that ready instructions are selected for issue by the instruction scheduler.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A reservation station to select instructions to issue to a functional unit in an out-of-order processor, the reservation station comprising:
    an instruction classifier configured to:
        receive a plurality of instructions, each instruction being one of a plurality of instruction types; and
        classify each instruction into one of a plurality of categories based on the type of instruction, the plurality of categories comprising one or more categories for control transfer instructions, flag setting instructions and address generation instructions;
    a plurality of instruction queues in communication with the instruction classifier, each instruction queue configured to receive instructions from the instruction classifier that have been classified into a particular category and store the received instructions, each instruction queue being assigned a priority; and
    an instruction scheduler in communication with each of the plurality of instruction queues, the instruction scheduler configured to select instructions from one or more of the instruction queues to issue to the functional unit in order of the assigned priorities so that instructions are selected based on a relative priority of the plurality of types of instructions.

2. The reservation station of claim 1, wherein the plurality of categories further comprises one or more other categories for other types of instructions, and the one or more instruction queues associated with the one or more categories for control transfer instructions, flag setting instructions and address generation instructions are assigned higher priorities than the one or more instruction queues associated with the one or more other categories.

3. The reservation station of claim 2, wherein the one or more other categories comprises a single general category for all other types of instructions.

4. The reservation station of claim 1, wherein the one or more categories for control transfer instructions, flag setting instructions, and address generation instructions comprises a category for control transfer instructions, a category for flag setting instructions, and a category for address generation instructions.

5. The reservation station of claim 4, wherein the instruction queue associated with the category for control transfer instructions is assigned the highest priority.

6. The reservation station of claim 1, wherein the instruction scheduler is configured to select instructions from the instruction queues in order of the priorities until a maximum number of instructions have been selected.

7. The reservation station of claim 6, wherein the functional unit comprises one or more pipelines and the maximum number of instructions selected is equal to the number of pipelines.

8. The reservation station of claim 1, wherein the instruction scheduler is configured to select instructions from a particular instruction queue by assessing each of one or more instructions in the particular instruction queue to determine if the instruction is ready and has not been previously issued.

9. The reservation station of claim 8, wherein the instruction scheduler is configured to select instructions from a particular instruction queue by assessing, in a clock cycle, each of one or more instructions in that particular instruction queue up to a maximum number of instructions for that particular queue to determine if that instruction is ready and has not been previously issued.

10. The reservation station of claim 9, wherein the instruction scheduler is configured to select instructions from a particular instruction queue by establishing a window covering instructions to be assessed in that particular queue, the window being defined by a head pointer pointing at a head instruction and a tail pointer pointing at a tail instruction.

11. The reservation station of claim 10, wherein the head instruction is the oldest instruction in the particular instruction queue that has not been issued.

12. The reservation station of claim 10, wherein the head instruction is the oldest instruction in the particular instruction queue that is ready and has not been issued.

13. The reservation station of claim 10, wherein the tail instruction is the $(X-1)^{th}$ instruction in the particular instruction queue following the head instruction, wherein X is the maximum number of instructions assessed in the particular instruction queue.

14. The reservation station of claim 1, wherein the instruction scheduler is configured to select up to a maximum number of instructions from a particular instruction queue.

15. The reservation station of claim 1, wherein the instruction scheduler is further configured to issue the selected instructions to the functional unit for execution.

16. The reservation station of claim 15, wherein the functional unit comprises one or more pipelines and issuing the selected instructions to the functional unit comprises issuing each selected instruction to one of the pipelines.

17. The reservation station of claim 1, wherein the out-of-order processor is a multi-threaded processor.

18. A method of selecting instructions to issue to a functional unit in an out-of-order processor, the method comprising:
receiving a plurality of instructions at a reservation station, each instruction being one of a plurality of types of instructions and being classified into one of a plurality of categories based on the type of instruction, the plurality of categories comprising one or more categories for control transfer instructions, flag setting instructions, and address generation instructions;
storing, at the reservation station, each instruction in one of a plurality of instruction queues, each instruction queue being associated with one of the plurality of categories, each instruction queue being assigned a priority; and
selecting, at the reservation station, instructions from one or more of the instruction queues to issue to the functional unit in order of the assigned priorities so that instructions are selected based on a relative priority of the plurality of types of instructions.

19. A non-transitory computer readable storage medium having stored thereon computer executable instructions, which when executed cause at least one processor to perform the method as set forth in claim 18.

20. A processor comprising the reservation station as set forth in claim 1.

* * * * *